No. 810,530. PATENTED JAN. 23, 1906.
J. GUEDEL.
SAW.
APPLICATION FILED JULY 15, 1905.
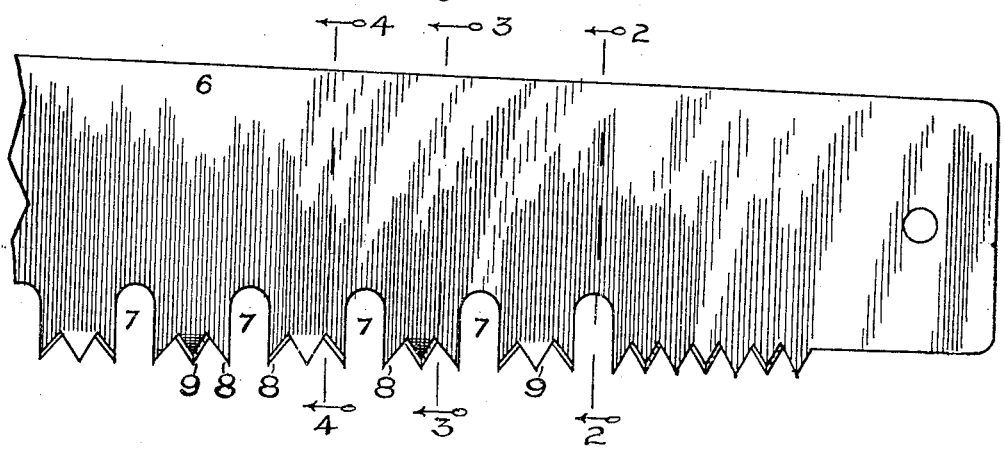
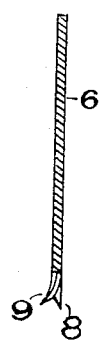
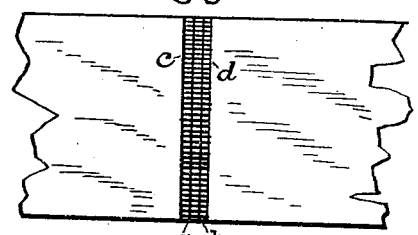
WITNESSES:
L. B. Worner
W<sup>m</sup> Hurte
INVENTOR:
John Guedel,
By Minturn & Worner,
Attorneys.

UNITED STATES PATENT OFFICE.

JOHN GUEDEL, OF INDIANAPOLIS, INDIANA.

SAW.

No. 810,530.     Specification of Letters Patent.     Patented Jan. 23, 1906.

Application filed July 15, 1905. Serial No. 269,878.

*To all whom it may concern:*

Be it known that I, JOHN GUEDEL, a citizen of the United States, residing at Indianapolis, in the county of Marion and State of Indiana, have invented certain new and useful Improvements in Saws, of which the following is a specification.

The object of this invention is to provide rake-teeth which will make two intermediate cuts in the kerf instead of a single middle one in order that the fiber which is to be removed in making the kerf will be in a looser and easier-handled condition than where only a single center cut is made.

The object of this invention also is to provide a saw in which the corresponding rake-teeth are situated in alternate groups instead of each successive group, thereby by the new arrangement affording a sufficient distance between the corresponding teeth to permit the following tooth to secure the necessary "bite" in the wood to make the saw effective.

The object of the invention is to make a saw which can be filed with ease and certainty and to provide a saw that will cut through the grain of the wood crosswise, lengthwise, or angling and which will saw through the knots and tangled grain and can be used in hard or soft wood for ripping, crosscutting, or mitering.

I accomplish the objects of the invention by the mechanism illustrated in the accompanying drawings, in which—

Figure 1 is a side elevation of a portion of a saw-blade provided with teeth made in accordance with my invention. Fig. 2 is a transverse section through the lines 2 2 of Fig. 1; Figs. 3 and 4, like sections through the dotted lines 3 3 and 4 4, respectively, of Fig. 1; and Fig. 5 is a plan view of a piece of wood with a saw-kerf made with my improved saw, showing the four cuts made by the saw-teeth in the kerf.

Like characters of reference indicate like parts throughout the several views of the drawings.

6 represents the saw-blade, and 7 represents deep concave cuts or gullets much wider than the width of the saw-teeth to form depositories for gathering and removing the sawdust. On each side of the gullet are the combined rake and cutting teeth 8, the edges of which on the sides next to the gullet are approximately straight and at right angles to the cutting edge of the saw. These straight sides are designated as the "front" sides as distinguished from the opposite oblique "rear" sides. Between the inclined sides of each pair of rake-teeth thus formed is a triangular cutting-tooth 9. The oblique edges of the two rake-teeth in each group of teeth are sharpened on the same side of the saw-blade and on a side just opposite to that on which the cutting-tooth between them is sharpened, and the teeth of the adjacent group are sharpened in a reverse order—that is, so that the cutting edges of the teeth will be on the opposite side of the blade from the cutting edges of the first teeth—and so on in the same alternate order for all the groups of the saw-blade. None of the rake-teeth will be swaged; but the cutting-teeth are swaged toward their cutting edges—that is, in opposite directions in each alternate group. The cutting-teeth, as shown in Fig. 2, will cut the fiber of the wood at the outer edges of the kerf, while the oppositely-filed rake-teeth will make two distinct cuts intermediate of the outside cut. These inside cuts are shown by the lines *a* and *b* in Fig. 5, and the outside cuts are shown by the lines *c* and *d* in said figure. This cuts the fiber of the wood to be removed in making the kerf into three lengths, which makes the fiber easier to break out and easier to remove, as it is in shorter pieces and not so liable to pack. The rake-teeth do most of the work of the saw, the cutting-teeth being more for the purpose of preventing binding. It will be noted that each combined rake and cutting tooth is separated from a correspondingly-shaped cutting and rake tooth by the remaining teeth of its own group and by the three teeth of another entire group of teeth, or, in other words, by the width of five other teeth and two gullets, and this separation affords ample room for a following tooth to enter a sufficient distance into the wood to give effective results in the sawing operation. This is an important feature of my invention.

Having thus fully described my invention, what I claim as new, and wish to secure by Letters Patent, is—

1. In a saw, combined rake and cutting teeth which are not swaged having one straight edge approximately at right angles to the longitudinal dimensions of the saw-blade, and a second side inclined to the first, said combined rake and cutting teeth being grouped in pairs with their inclined sides toward each other, the inclined edges of said teeth of each pair being sharpened on the same side of the saw-blade but said teeth of adjacent pairs being sharpened on opposite sides of the blade, and triangular cutting-teeth swaged in alternate opposite directions, introduced singly between each pair of said combined rake and cutting teeth.

2. A saw having teeth in groups separated by deep gullets, said groups, except at the extreme end of the saw-blade, consisting of three teeth, the outer teeth of said groups having straight square outer edges approximately at right angles to the longitudinal dimensions of the blade, and inner inclined edges the latter edges of both teeth sharpened on one and the same side of the blade to form cutting edges at the opposite side of the blade, the said teeth of adjacent groups being filed from opposite sides of the blade to produce a double row of cutting-points at the ends of the teeth separated by the thickness of the blade, and a middle triangular cutting-tooth in each group sharpened on opposite sides of the blade from that of the other two teeth of the group, said cutting-teeth being swaged toward the cutting edges of said teeth.

3. In a saw, a pair of combined rake and cutting teeth, each having one straight square edge approximately at right angles to the longitudinal dimensions of the saw-blade and having a second edge inclined to the first edge, said inclined edges of the two teeth of a group being sharpened on the same side of the blade to form cutting edges on the opposite side of the blade, said teeth of adjacent groups being sharpened from opposite sides of the blade, said teeth not being swaged and together forming two cutting rows separated at the ends of the teeth, by the thickness of the saw-blade, and a single triangular swaged cutting-tooth between each pair of the first-described teeth forming a group of three teeth, the last-named teeth of each group being swaged in alternate opposite directions to form cutting-points in two additional lines.

In witness whereof I have hereunto set my hand and seal, at Indianapolis, Indiana, this 3d day of July, A. D. 1905.

JOHN GUEDEL. [L. S.]

Witnesses:
J. A. MINTURN,
F. W. WOERNER.